United States Patent
Zhao et al.

(10) Patent No.: US 11,519,614 B2
(45) Date of Patent: Dec. 6, 2022

(54) AIR CONDITIONER WITH AIR PURIFYING FUNCTION

(71) Applicant: Hisense Air Conditioning Co., Ltd., Qingdao (CN)

(72) Inventors: Keke Zhao, Qingdao (CN); Xifeng Zhao, Qingdao (CN); Baochen Xie, Qingdao (CN)

(73) Assignee: Hisense Air Conditioning Co., Ltd., Qiangdao (CN)

( * ) Notice: Subject to any disclaimer, the term of this patent is extended or adjusted under 35 U.S.C. 154(b) by 649 days.

(21) Appl. No.: 16/538,319

(22) Filed: Aug. 12, 2019

(65) Prior Publication Data
US 2019/0360706 A1  Nov. 28, 2019

Related U.S. Application Data

(63) Continuation of application No. PCT/CN2017/112632, filed on Nov. 23, 2017.

(30) Foreign Application Priority Data

Feb. 10, 2017 (CN) .......................... 201710075392.1

(51) Int. Cl.
*F24F 1/0073* (2019.01)
*F24F 1/008* (2019.01)
(Continued)

(52) U.S. Cl.
CPC ........ *F24F 1/0073* (2019.02); *B01D 46/0038* (2013.01); *B01D 46/0043* (2013.01);
(Continued)

(58) Field of Classification Search
None
See application file for complete search history.

(56) References Cited

U.S. PATENT DOCUMENTS 2,908,147 A * 10/1959 Powers ................... F24F 1/035
  55/467
4,546,820 A * 10/1985 Whipple ............... F28D 1/0435
  165/77
(Continued)

FOREIGN PATENT DOCUMENTS

CN  201852219 U  6/2011
CN  202253995 U  5/2012
(Continued)

OTHER PUBLICATIONS

Office Action dated Feb. 3, 2019 for China Patent Application No. 201710075392.1 (with English language translation) (13 pp.).
(Continued)

*Primary Examiner* — Christopher P Jones
*Assistant Examiner* — Brit E. Anbacht
(74) *Attorney, Agent, or Firm* — Crowell & Moring LLP

(57) ABSTRACT

An air conditioner with an air purifying function includes a housing having an air inlet and an air outlet thereon. An air conditioning assembly and an air purifying assembly are disposed in the housing. The air conditioning assembly includes an air conditioning flue. A first fan and a heat exchanger are disposed in the air conditioning flue. The air conditioning flue connects with the air inlet and the air outlet respectively. The air purifying assembly includes an air purifying flue. A second fan and an air filter screen are disposed in the air purifying flue. The air purifying flue connects with the air inlet and the air outlet respectively.

11 Claims, 5 Drawing Sheets

(51) Int. Cl.
  *B01D 46/00* (2022.01)
  *B01D 46/10* (2006.01)
  *F24F 1/0014* (2019.01)
  *F24F 1/0025* (2019.01)
  *F24F 1/0033* (2019.01)
  *F24F 1/0059* (2019.01)
  *F24F 8/10* (2021.01)
  *F24F 8/192* (2021.01)
  *F24F 8/108* (2021.01)

(52) U.S. Cl.
  CPC .............. *B01D 46/10* (2013.01); *F24F 1/008* (2019.02); *F24F 1/0014* (2013.01); *F24F 1/0025* (2013.01); *F24F 1/0033* (2013.01); *F24F 1/0059* (2013.01); *F24F 8/10* (2021.01); *F24F 8/108* (2021.01); *F24F 8/192* (2021.01); *B01D 2279/50* (2013.01)

(56) References Cited

U.S. PATENT DOCUMENTS

| | | | | |
|---|---|---|---|---|
| 5,564,495 | A * | 10/1996 | Yoshihashi | F28F 1/32 165/145 |
| 5,564,626 | A * | 10/1996 | Kettler | F24F 3/044 55/471 |
| 2005/0284168 | A1* | 12/2005 | Lee | F24F 1/0057 55/471 |
| 2009/0032216 | A1* | 2/2009 | Kim | B60H 1/00064 55/490.1 |
| 2009/0098014 | A1* | 4/2009 | Longstaff | A61L 9/205 422/4 |
| 2012/0018117 | A1* | 1/2012 | Yamada | F24F 1/0073 165/104.34 |
| 2014/0082957 | A1* | 3/2014 | Harris | A61L 9/12 34/239 |
| 2015/0354874 | A1* | 12/2015 | Cur | F24F 8/10 29/890.035 |
| 2015/0369527 | A1* | 12/2015 | Ghadiri Moghaddam | F24F 3/1423 62/305 |
| 2016/0169586 | A1* | 6/2016 | Ito | F28D 1/05333 29/890.03 |
| 2017/0144097 | A1* | 5/2017 | Wang | B01D 46/429 |
| 2018/0099064 | A1* | 4/2018 | Burns | A61L 9/12 |
| 2018/0142906 | A1* | 5/2018 | Wu | F24F 13/081 |
| 2019/0212018 | A1* | 7/2019 | Kim | F24F 13/06 |
| 2019/0242595 | A1* | 8/2019 | Eplee | F28D 9/0025 |
| 2020/0129909 | A1* | 4/2020 | Hong | F04D 25/16 |
| 2020/0256572 | A1* | 8/2020 | Bjørn | F24F 12/001 |
| 2021/0322914 | A1* | 10/2021 | Keeler | B01D 46/10 |
| 2022/0049863 | A1* | 2/2022 | Abizeid | B01D 53/0454 |

FOREIGN PATENT DOCUMENTS

| | | | |
|---|---|---|---|
| CN | 104033961 A | 9/2014 | |
| CN | 203928213 U | 11/2014 | |
| CN | 105020793 A | 11/2015 | |
| CN | 105674400 A | 6/2016 | |
| CN | 205561011 U | 9/2016 | |
| CN | 107062391 A | 8/2017 | |
| EP | 2 778 547 A2 | 9/2014 | |
| GB | 2246084 A * | 1/1992 | ......... B01D 46/0012 |
| JP | H 10-19340 | 1/1998 | |
| JP | 2014-178075 A | 9/2014 | |
| KR | 10-2005-0118784 A | 12/2005 | |
| WO | WO-2019016981 A1 * | 1/2019 | ................ F24F 1/00 |

OTHER PUBLICATIONS

Search Report and Written Opinion for International Patent Application No. PCT/CN2017/112632 dated Feb. 14, 2018 (with English language translation) (19 pp.).

Search Report and Written Opinion for International Patent Application No. PCT/CN2017/112632 dated Feb. 14, 2018; 11 pages.

* cited by examiner

AIR CONDITIONER WITH AIR PURIFYING FUNCTION

CROSS-REFERENCE TO RELATED APPLICATION(S)

This application is a Bypass Continuation Application of PCT/CN2017/112632, filed Nov. 23, 2017, which claims priority to Chinese Patent Application No. 201710075392.1, submitted to Chinese Patent Office on Feb. 10, 2017, titled "AIR CONDITIONER WITH AIR PURIFYING FUNCTION", all of which are incorporated herein by reference in their entirety.

TECHNICAL FIELD

The disclosure describes innovations relating to the technical fields of air conditioners, and in particular, to an air conditioner with an air purifying function.

BACKGROUND

With the improvement of people's living standards, air conditioners have become indispensable household appliances. Users have increasing demands for functions of air conditioners.

A structure of a conventional wall-mounted air conditioner is shown in FIG. 1, which includes a housing 01. The housing 01 is provided with a fan 02 and a heat exchanger 03 therein. The housing 01 is provided with an air inlet 011 and an air outlet 012 thereon. The air in and out circulation process of the air conditioner is as follows: air outside the housing 01 entering the air conditioner through the air inlet 011, entering the fan 02 after heat exchange by the heat exchanger 03, being sent into an air flue by the fan 02, and the heat-exchanged air being discharged out of the housing through the air outlet 012 by the guiding action of an air deflector 04.

The wall-mounted air conditioner in the prior art has a single function and only regulates the air temperature. Due to serious air pollution, the haze weather has a huge impact on people's life. In order to filter air, it is also necessary to purchase a purifier, which increases economic cost and wastes space.

SUMMARY

Some embodiments of the present disclosure provide an air conditioner with an air purifying function including a housing. The housing is provided with an air inlet and an air outlet thereon, and an air conditioning assembly and an air purifying assembly is disposed in the housing. The air conditioning assembly includes an air conditioning flue. The air conditioning flue is provided with a first fan and a heat exchanger, and connects with the air inlet and the air outlet respectively. The air purifying assembly includes an air purifying flue. The air purifying flue is provided with a second fan and an air filter screen, and connects with the air inlet and the air outlet respectively. The air conditioning flue and the air purifying flue are connected in series. An air entering side of the air purifying flue is connected to the air inlet, an air exiting side of the air purifying flue is connected to an air entering side of the air conditioning flue, and an air exiting side of the air conditioning flue is connected to the air outlet. An auxiliary tuyere is provided on the housing at a position corresponding to a joint of the air conditioning flue and the air purifying flue. A ventilation door is provided at the auxiliary tuyere, and the ventilation door is switchable between a first position and a second position. When the ventilation door is placed at the first position, the ventilation door blocks the auxiliary tuyere and the air conditioning flue is connected to the air purifying flue. When the ventilation door is placed at the second position, the ventilation door opens the auxiliary tuyere and the air conditioning flue is disconnected to the air purifying flue, and the air exiting side of the air purifying flue is connected to the auxiliary tuyere.

BRIEF DESCRIPTION OF THE DRAWINGS

In order to describe technical solutions in some embodiments of the present disclosure or in the prior art more clearly, the accompanying drawings to be used in the description of embodiments or the prior art will be introduced briefly. Obviously, the accompanying drawings to be described below are merely some embodiments of the present disclosure, and a person of ordinary skill in the art can obtain other drawings according to these drawings without paying any creative effort.

DETAILED DESCRIPTION

Figure 1:
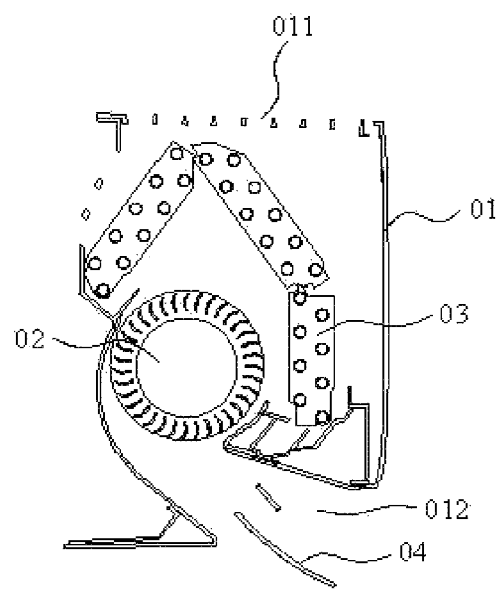
FIG. 1 is a schematic structural diagram of an air conditioner in the prior art.

The technical solutions in the embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort should be included in the protection scope of the present disclosure.

In the description of the present disclosure, it will be understood that orientations or positional relationships indicated by terms "center", "upper", "lower", "front", "rear", "left", "right", "vertical", "horizontal", "top", "bottom", "inner", "outer", etc. are based on orientations or positional relationships shown in the drawings, which merely for the convenience of describing the present disclosure and simplifying the description, but not to indicate or imply that the referred devices or elements must have a particular orientation, or must be constructed or operated in a particular orientation. Therefore, it should not be construed as limiting the present disclosure.

In the description of the present disclosure, it will be noted that the terms "installation", "connected", and "attached" are to be understood broadly, unless explicitly stated and limited, for example, it may be a fixed connection, a detachable connection, or an integral connection; it will be understood by those of ordinary skill in the art that specific meanings of the above terms in the present disclosure may be specifically understood.

The terms "first" and "second" are used for descriptive purposes only and are not to be construed as indicating or implying the relative importance or implicitly indicating the number of indicated technical features. Thus, features defined as "first", "second" may explicitly or implicitly include one or more of the features. In the description of the present disclosure, "a plurality of" means two or more unless otherwise specified.

Figure 2:
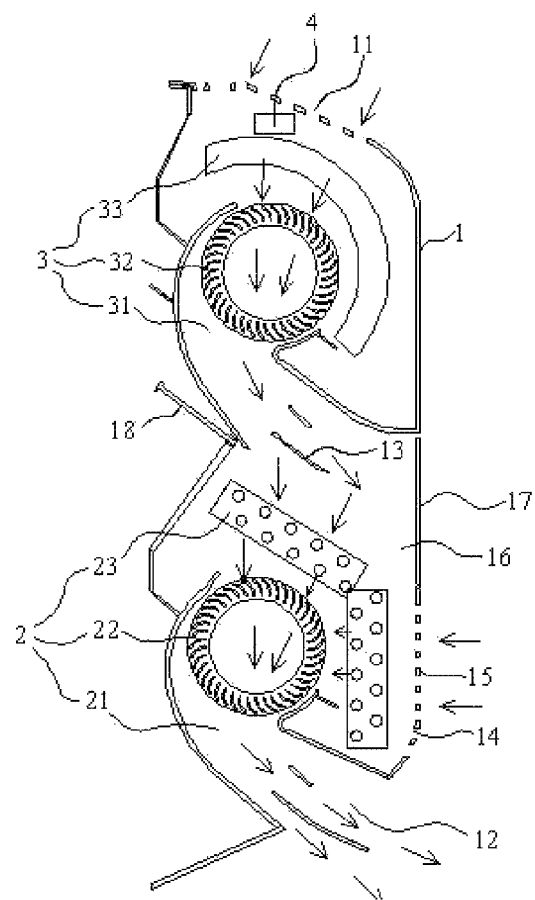
FIG. 2 is a schematic structural diagram of an air conditioner according to an embodiment of the present disclosure in a first operation mode.

FIG. 2 illustrates an air conditioner with an air purifying function provided by some embodiments of the present disclosure. The air conditioner with the air purifying function includes a housing 1, an air inlet 11 and an air outlet 12 are disposed on the housing 1, and an air conditioning assembly 2 and an air purifying assembly 3 are disposed in the housing 1. The air conditioning assembly 2 includes an air conditioning flue 21. A first fan 22 and a heat exchanger 23 are disposed in the air conditioning flue 21, and the air conditioning flue 21 connects with the air inlet 11 and the air outlet 12 respectively. The air purifying assembly 3 includes an air purifying flue 31, a second fan 32 and an air filter screen 33 are disposed in the air purifying flue 31, and the air purifying flue 31 connects with the air inlet 11 and the air outlet 12 respectively.

Since the air conditioning assembly 2 is disposed in the housing 1, the air conditioning assembly 2 includes an air conditioning flue 21, a first fan 22 and a heat exchanger 23 are disposed in the air conditioning flue 21, and the air conditioning flue 21 connects with the air inlet 11 and the air outlet 12 respectively, therefore the air conditioner with an air purifying function provided by some embodiments of the present disclosure can realize a temperature regulation function. In addition, an air purifying assembly 3 is also disposed in the housing 1. The air purifying assembly 3 includes the air purifying flue 31, the second fan 32 and the air filter screen 33 are disposed in the air purifying flue 31, and the air purifying flue 31 connects with the air inlet 11 and the air outlet 12 respectively. Air can be introduced into the air filter screen 33 by the second fan 32 for filtration, thereby achieving the function of air purifying. Therefore, one air conditioner can have two functions of adjusting temperature and purifying air, which reduces cost and saves space.

The air conditioning flue 21 and the air purifying flue 31 can be arranged in series or in parallel.

When the air conditioning flue 21 and the air purifying flue 31 are connected in series, the structure is shown in FIG. 2. The air entering side of the air purifying flue 31 is connected to the air inlet 11, the air exiting side of the air purifying flue 31 is connected to the air entering side of the air conditioning flue 21, and the air exiting side of the air conditioning flue 21 is connected to the air outlet 12. When both the first fan 22 and the second fan 32 are turned on, air outside the housing 1 enters the housing 1 through the air inlet 11, and is sent out through the air outlet 12 after sequentially passing through the air filter screen 33, the second fan 32, an air deflector 13, the heat exchanger 23 and the first fan 22. In this case, the discharged air is filtered by the air filter screen 33 and heat-exchanged in the heat exchanger 23, thereby achieving the purposes of purifying air and adjusting temperature and humidity. Moreover, the structure only needs to provide an air inlet 11 and an air outlet 12 on the housing 1 to realize the air entering and exiting of the air conditioning flue 21 and the air purifying flue 31 simultaneously. Compared with the solution that the air conditioning flue 21 and the air purifying flue 31 are connected in parallel, the overall structure is simpler, and the transverse width is smaller. In addition, since the air conditioning flue 21 and the air purifying flue 31 are connected, the first fan 22 and the second fan 32 can simultaneously accelerate the air, thereby increasing the flow rate of the air. Moreover, the user can also select to turn on only one of the fan, and the functions of adjusting the temperature and purifying the air can also be realized, thereby meeting different working conditions.

It should be noted that, structures shown in FIGS. 2 to 7 are structural diagrams of the air purifying assembly 3 disposed at the upper side of the air conditioning assembly 2, and arrows in the figures indicate flow direction of the air. In some embodiments of the present disclosure, the air purifying assembly 3 can also be disposed at the lower side of the air conditioning assembly 2, so that the air entering side of the air conditioning flue 21 is connected to the air inlet 11. The air exiting side of the air conditioning flue 21 is connected to the air entering side of the air purifying flue 31, and the air exiting side of the air purifying flue 31 is connected to the air outlet 12. There is no limit here.

In order to rapidly adjust indoor temperature, as shown in FIG. 2, an air conditioner inlet 14 is disposed on the housing 1 at a position corresponding to the air conditioning assembly 2, so that the air conditioner inlet 14 is connected to the air entering side of the air conditioning flue 21. An air entering grating 15 is disposed at the air conditioner inlet 14, and the air entering grating can open or close the air conditioner inlet 14. Therefore, when it is necessary to rapidly adjust the indoor temperature, the air conditioner inlet 14 can be opened to increase the amount of air entering the air conditioning assembly 2, thereby accelerating the adjustment of the indoor temperature. When the indoor temperature meets the requirement, the air conditioner inlet 14 can be closed. As such, the amount of air entering the air conditioning assembly 2 can be reduced to stabilize the indoor temperature.

Figure 3:
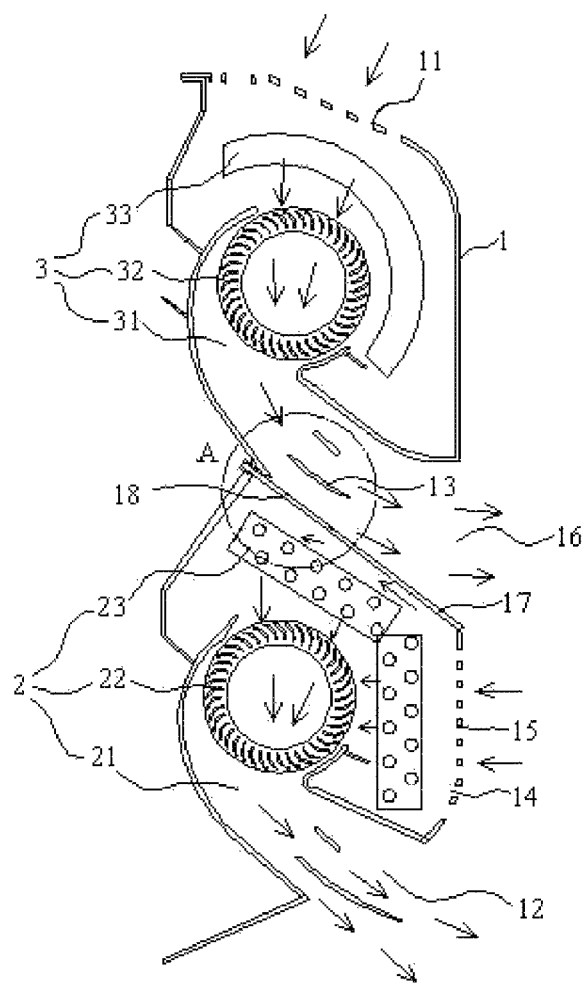
FIG. 3 is a schematic structural diagram of an air conditioner according to an embodiment of the present disclosure in a second operation mode.

As shown in FIGS. 2 and 3, in order to expediently control the working forms of the air conditioning assembly 2 and the air purifying assembly 3 respectively. An auxiliary tuyere 16 can be disposed on the housing 1 at a position corresponding to the joint of the air conditioning flue 21 and the air purifying flue 31, and a ventilation door 17 is disposed at the auxiliary tuyere 16. Herein, the ventilation door 17 is switchable between a first position (the position of the ventilation door in FIG. 2) and a second position (the position of the ventilation door in FIG. 3). As shown in FIG. 2, when the ventilation door 17 is placed at the first position, the ventilation door 17 blocks the auxiliary tuyere 16, and the air conditioning flue 21 is connected to the air purifying flue 31. When the ventilation door 17 is placed at the second position, as shown in FIG. 3, the ventilation door 17 opens the auxiliary tuyere 16, and the air conditioning flue 21 is disconnected to the air purifying flue 31, so that the air exiting side of the air purifying flue 31 is connected the auxiliary tuyere 16. In this case, the amount of discharged air of the air conditioning assembly 2 and the air purifying assembly 3 can be separately controlled. For example, the amount of discharged air can be adjusted by adjusting rotating speed of the fans, so that the control form is more diversity to meet different needs of users.

Figure 4:
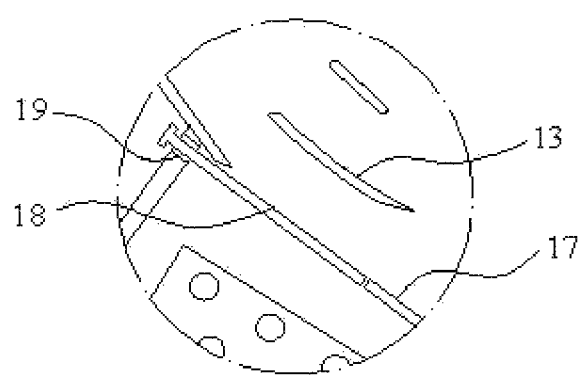
FIG. 4 is an enlarged diagram of the portion A of FIG. 3.

In order to achieve the above functions, the ventilation door 17 can use a structure as shown in FIG. 3. The ventilation door 17 is hinged to the edge of a side of the auxiliary tuyere 16 close to the air conditioning flue 21. A lap plate 18 is disposed on a side wall in the housing 1 opposite to the side wall where disposed the ventilation door 17, and the ventilation door 17 is rotatable toward the inside of the housing 1. When the ventilation door 17 is rotated to the second position, as shown in FIGS. 3 and 4, the ventilation door 17 laps with the lap plate 18 to disconnect the air conditioning flue 21 and the air purifying flue 31. The structure is simple and easy to realize.

Figure 5:
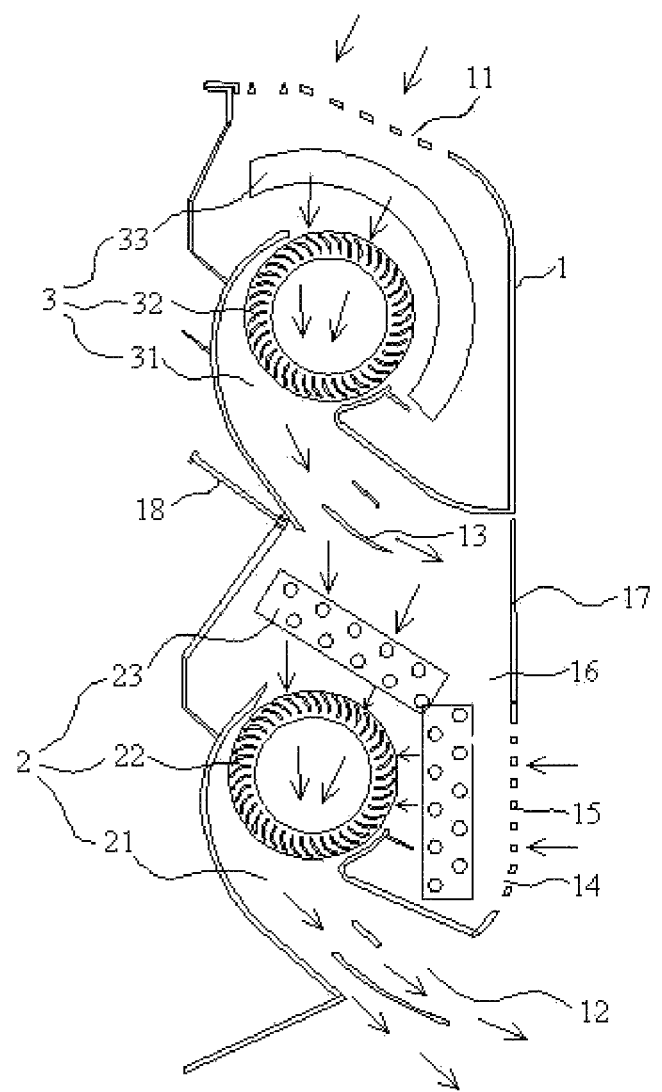
FIG. 5 is a schematic structural diagram of a lap plate in FIG. 3 at a pulled-out state.

In some embodiments, the lap plate 18 can be provided in a stretchable structure. As shown in FIG. 4, a slot 19 can be disposed on a side wall in the housing 1 opposite to the side wall where disposed the ventilation door 17. The lap plate 18 is fitly inserted into the slot 19 and can slide relative to the slot 19 to change a length of the lap plate 18 extending into the housing 1. Therefore, when it is necessary to switch the ventilation door 17 to the second position, the lap plate 18 can be inserted into the housing 1 so that the length of the lap plate 18 within the housing 1 is extended to expediently lap with the ventilation door 17. Since the length of the lap plate 18 within the housing 1 is long enough, the ventilation door 17 does not need to be made too long, which facilitates the rotation of the ventilation door 17, and prevents the ventilation door 17 from interfering with other structures (such as the air deflector 13) within the housing 1 as the ventilation door 17 rotates. When it is necessary to switch the ventilation door 17 to the first position, as shown in FIG. 5, the lap plate 18 can be withdrawn from the housing 1 through the slot 19, thereby preventing the lap plate 18 that extends into the housing 1 from blocking the air in the air flue, which affects the amount of discharged air.

When setting the extending and contracting direction of the lap plate 18, in some embodiments, the extending direction of the lap plate 18 is disposed to be parallel to the extending direction of the air deflector 13 in the housing 1. Thereby, the lap plate 18 can also have an air guide effect, and reduce the blocking of the air by the lap plate 18.

Figure 6:
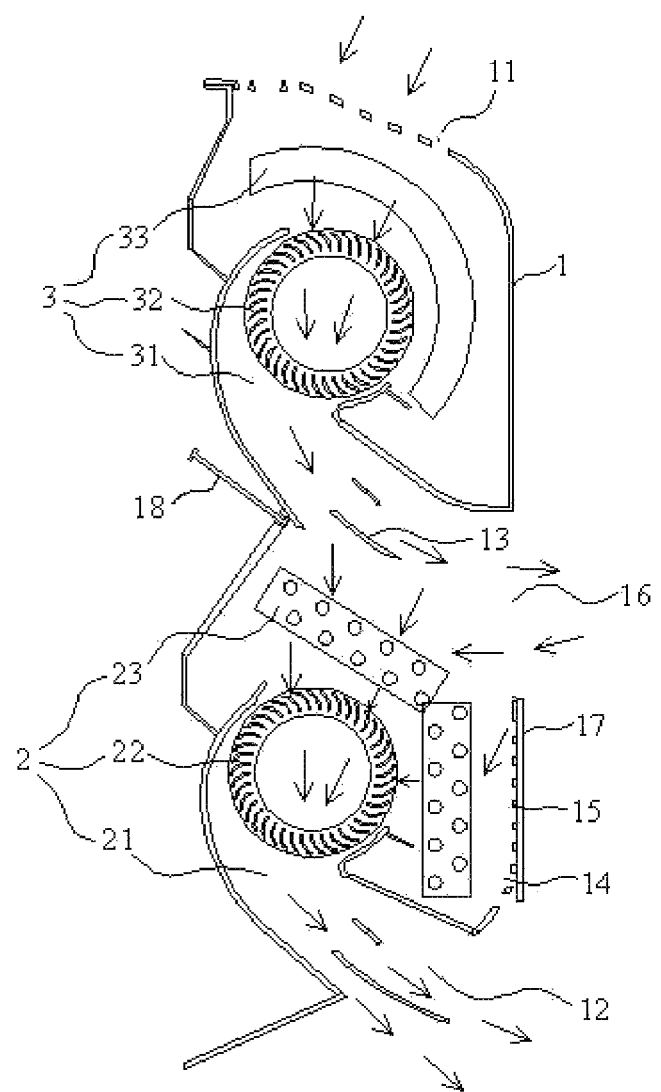
FIG. 6 is a schematic structural diagram of an air conditioner according to an embodiment of the present disclosure in a third operation mode.

In some embodiments of the present disclosure, as shown in FIG. 6, the ventilation door 17 can also be switched to a third position (the position of the ventilation door in FIG. 6). When the ventilation door 17 is switched to the third position, the ventilation door 17 can block the air conditioner inlet 14. Therefore, a static pressure difference can be generated between the inside and outside of the housing 1, so that a part of the purified air can enter the heat exchanger 23, and the other part of the purified air is sent into the room by the auxiliary tuyere 16. Meanwhile, the indoor air enters the heat exchanger 23 through the auxiliary tuyere 16 under the action of the static pressure difference to exchange heat, thereby realizing dual functions of purification and air conditioning, and accelerating the air purifying and air conditioning capabilities to the utmost extent.

In order to achieve the above functions, the air conditioner inlet 14 is disposed close to the hinged joint of the ventilation door 17. The ventilation door 17 is rotatable toward the outside of the housing 1. When the ventilation door 17 is rotated to the third position, the ventilation door 17 is attached to the outside wall of the air conditioner inlet 14 to block the air conditioner inlet 14.

Figure 7:
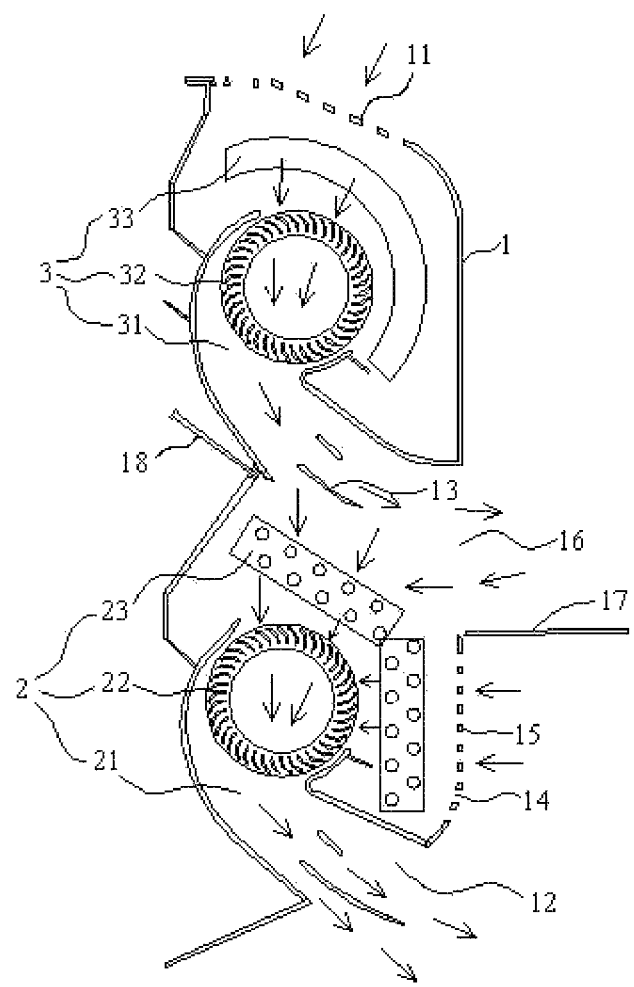
FIG. 7 is a schematic structural diagram of an air conditioner according to an embodiment of the present disclosure in a fourth operation mode.

In some embodiments of the present disclosure, as shown in FIG. 7, the ventilation door 17 can also be switched to a fourth position (position of the ventilation door in FIG. 7). When the ventilation door 17 is switched to the fourth position, the ventilation door 17 is located outside the housing 1 and is perpendicular to the outside wall of the housing 1 provided with the auxiliary tuyere 16. In this case, the ventilation door 17 neither blocks the auxiliary tuyere 16 and the air conditioner inlet 14, nor blocks the air of the air purifying flue 31 from entering the air conditioning flue 21, thereby maximizing the amount of air passing through the heat exchanger 23, so that the temperature and humidity of the air in the room can meet the requirement as quickly as possible.

In order to achieve the above functions, a window catch or other support limiting member (not shown) can be disposed between the ventilation door 17 and the outside wall of the housing 1 for supporting the ventilation door 17 to maintain the ventilation door 17 at the fourth position. It is also possible to design the ventilation door 17 to be detachably hinged with the housing 1. When the above functions need to be realized, the ventilation door 17 can be detached to make the air temperature and humidity of the room meet the requirement as quickly as possible, and realize the air conditioning function rapidly. Meanwhile, the air purifying function is achieved, so that the indoor indexes of PM2.5, temperature, humidity and the like of the room all meet requirements.

When the air conditioning flue 21 and the air purifying flue 31 are connected in parallel, the air conditioning flue 21 and air purifying flue 31 do not connected to each other, working separately. One fan can be used to simultaneously supply air to the air conditioning flue 21 and air purifying flue 31, or two fans can be respectively used to supply air.

As shown in FIG. 2, the heat exchanger 23 can be a V-shaped (two-fold structure) heat exchanger or a U-shaped (three-fold structure) heat exchanger. A portion of the heat exchanger 23 is located between the air conditioner inlet 14 and the air entering side of the fan, and another portion of the heat exchanger 23 is located between the air exiting side of the air purifying flue 31 and the air entering side of the fan. Thereby, heat exchange efficiency can be improved.

The first fan 22 and the second fan 32 are cross-flow fans. Compared with a centrifugal fan and an axial-flow fan, the cross-flow fan has a large air exiting amount and low noise. Specifically, the two cross-flow fans can be disposed in parallel as shown in FIG. 2. When two cross-flow fans arranged in parallel are connected in series, the two cross-flow fans are more matched to the acceleration effect of the wind, and the airflow is more stable and less turbulent.

The air filtering screen 33 is a high efficiency particle air filter (i.e. a HEPA filter). The HEPA screen can effectively filter and capture particles with diameters of 0.3 microns and more, with an efficiency of 99.7% or more. This has a better filtering effect.

In order to achieve some additional functions and bring the best comfort experience to users, as shown in FIG. 2, an additional functional module 4 can be disposed in the air purifying flue 31, such as a fragrance module, a nano-water ion module, an electronic sterilization module, or the like. The fragrance module can remove the peculiar smell of the indoor air. The nano-water ion is more suitable for the absorption of the human skin and can inhibit bacterium. The electronic sterilization module can sterilize. Therefore, the device can meet requirements of different users.

The foregoing descriptions are merely some specific implementation manners of the present disclosure, but the protection scope of the present disclosure is not limited thereto, and the changes or replacements that any person skilled in the art can easily think of in the technical scope disclosed by the present disclosure should be within the protection scope of the present disclosure. Therefore, the protection scope of the present disclosure shall be determined by the protection scope of the claims.

What is claimed is:

1. An air conditioner with an air purifying function, the air conditioner comprising:

a housing having an air inlet and an air outlet thereon;
an air conditioning flue provided in the housing with a first fan and a heat exchanger therein;
an air purifying flue provided in the housing with a second fan and an air filter screen therein;
wherein the air conditioning flue and the air purifying flue are connected in series, an air entering side of the air purifying flue is connected to the air inlet, an air exiting side of the air purifying flue is connected to an air entering side of the air conditioning flue, and an air exiting side of the air conditioning flue is connected to the air outlet; and
a ventilation door provided at an auxiliary tuyere disposed on the housing at a position corresponding to a joint of the air conditioning flue and the air purifying flue, wherein the ventilation door is switchable between a first position and a second position;
wherein when the ventilation door is placed at the first position, the ventilation door blocks the auxiliary tuyere and the air conditioning flue is connected to the air purifying flue;
when the ventilation door is placed at the second position, the ventilation door opens the auxiliary tuyere and the air conditioning flue is disconnected from the air purifying flue, and the air exiting side of the air purifying flue is connected to the auxiliary tuyere;
an air conditioner inlet is disposed on the housing, the air conditioner inlet is connected to the air entering side of the air conditioning flue, an air entering grating is disposed at the air conditioner inlet, and the air entering grating is able to open or close the air conditioner inlet; and
the heat exchanger is a V-shaped heat exchanger or a U-shaped heat exchanger, a portion of the heat exchanger is located between the air conditioner inlet and an air entering side of the first fan, and another portion of the heat exchanger is located between the air exiting side of the air purifying flue and the air entering side of the first fan.

2. The air conditioner according to claim 1, further comprising a lap plate provided on a side wall in the housing opposite to a side wall where the ventilation door is provided;
wherein the ventilation door is hinged to an edge of a side of the auxiliary tuyere close to the air conditioning flue, the ventilation door is rotatable toward the inside of the housing, and when the ventilation door is rotated to the second position, the ventilation door is lapped with the lap plate, so as to disconnect the air conditioning flue and the air purifying flue.

3. The air conditioner according to claim 2, further comprising a slot provided on a side wall in the housing opposite to a side wall where provided with the ventilation door is provided,
wherein the lap plate is inserted into the slot and is able to slide relative to the slot to change a length of the lap plate extending into the housing.

4. The air conditioner according to claim 3, further comprising an air deflector provided in the housing and located between the air exiting side of the air purifying flue and the air entering side of the air conditioning flue;
wherein an extending and contracting direction of the lap plate is disposed to be parallel to an extending direction of the air deflector.

5. The air conditioner according to claim 1, wherein the ventilation door is able to switch to a third position, and when the ventilation door is switched to the third position, the ventilation door can block the air conditioner inlet.

6. The air conditioner according to claim 5, wherein the air conditioner inlet is disposed close to a hinged joint of the ventilation door, the ventilation door is rotatable toward the outside of the housing, and when the ventilation door is rotated to the third position, the ventilation door is attached to the outside wall of the air conditioner inlet to block the air conditioner inlet.

7. The air conditioner according to claim 1, wherein the ventilation door is able to switch to a fourth position, and when the ventilation door is switched to the fourth position, the ventilation door is located outside the housing and is perpendicular to the outside wall of the housing provided with the auxiliary tuyere.

8. The air conditioner according to claim 7, wherein the ventilation door is a detachable ventilation door.

9. The air conditioner according to claim 1, wherein the first fan and the second fan are cross-flow fans.

10. The air conditioner according to claim 1, wherein the air filter screen is a high efficiency particle air filter.

11. The air conditioner according to claim 1, wherein the air purifying flue is provided with a fragrance module, a nano-water ion module, or an electronic sterilization module.

* * * * *